(12) United States Patent
Hong et al.

(10) Patent No.: US 7,345,122 B2
(45) Date of Patent: Mar. 18, 2008

(54) HIGH STEREOSPECIFIC POLYBUTYLENE POLYMER AND HIGHLY ACTIVE PROCESS FOR PREPARATION THEREOF

(75) Inventors: Seung Pyo Hong, Ulsan (KR); Min Kyu Park, Ulsan (KR); Deok Kyeong Kim, Ulsan (KR); Seok Joong Hwang, Seoul (KR)

(73) Assignee: Ylem Technology Holdings, Inc., Ulsan (KR)

( * ) Notice: Subject to any disclaimer, the term of this patent is extended or adjusted under 35 U.S.C. 154(b) by 0 days.

(21) Appl. No.: 10/569,411

(22) PCT Filed: Mar. 31, 2004

(86) PCT No.: PCT/KR2004/000755

§ 371 (c)(1),
(2), (4) Date: Feb. 23, 2006

(87) PCT Pub. No.: WO2005/021611

PCT Pub. Date: Mar. 10, 2005

(65) Prior Publication Data

US 2007/0015862 A1    Jan. 18, 2007

(30) Foreign Application Priority Data

Aug. 30, 2003 (KR) .................. 10-2003-0060635

(51) Int. Cl.
*C08F 2/38* (2006.01)
*C08F 110/08* (2006.01)

(52) U.S. Cl. .................. 526/236; 526/125.3; 526/194; 526/348.6; 526/905

(58) Field of Classification Search ............. 526/125.3, 526/194, 236, 348.6, 905
See application file for complete search history.

(56) References Cited

U.S. PATENT DOCUMENTS

| 4,324,875 A | 4/1982 | Harada et al. |
| 4,404,341 A | 9/1983 | Ushida et al. |
| 4,725,656 A | 2/1988 | Kashiwa et al. |
| 5,053,467 A | 10/1991 | Kondo et al. |
| 5,241,024 A * | 8/1993 | Yamawaki et al. ......... 526/128 |

FOREIGN PATENT DOCUMENTS

| EP | 0172961 | * | 3/1986 |
| KR | 1982-0001309 | | 7/1982 |

* cited by examiner

Primary Examiner—Fred Teskin
(74) Attorney, Agent, or Firm—IPLA P.A.; James E. Bame (57) ABSTRACT

Disclosed is a process for the preparation of a high stereospecific (isotactic) polybutylene polymer comprising the step of polymerizing a reactive monomer, 1-butene, which is used or is not used as a solvent, in the presence of catalyst and inert gas. According to the present invention, it is possible to prepare a high stereospecific polybutylene polymer in much higher activity than that of any other known processes for the preparation of a high stereospecific polybutylene polymer. The high stereospecific polybutylene polymer according to the present invention is a homopolymer of 1-butene, or a copolymer containing a-olefin and up to 40% by weight of a comonomer, wherein titanium in the catalyst residues is not detected in the ppm level, stereospecificity (Isotactic Index, mmmm %) determined by $^{13}$C-NMR is 96 or more, molecular weight distribution (Mw/Mn) is 3-6, and molecular weight distribution (Mw/Mn) can be controlled to 8 or more.

3 Claims, 4 Drawing Sheets

[* sample A:Polybutylene polymerized without an external electron donor]

13C-NMR spectrum of sample "A" in the range of 26~28ppm

Fig. 3

[* sample B:Polybutylene polymerized with an external electron donor]

$^{13}$C-NMR spectrum of sample "B" in the range of 26~28ppm

HIGH STEREOSPECIFIC POLYBUTYLENE POLYMER AND HIGHLY ACTIVE PROCESS FOR PREPARATION THEREOF

TECHNICAL FIELD

The present invention relates to a high stereospecific polybutylene polymer and a highly active process for preparation thereof, and more particularly relates to a high stereospecific polybutylene polymer and a highly active process for preparation thereof, wherein the process is carried out using inert gas, which has not been used in the conventional polymerization processes of 1-butene, and so titanium in the catalytic residues is not detected in the ppm level.

BACKGROUND ART

Generally, a stereospecific polybutylene is a semi-crystal polymer of 1-butene as a monomer, and is a polyolefin having a high molecular weight, and has generic physical properties similar to those of polyethylene or polypropylene.

A stereospecific polybutylene has characteristic features such as high flexural resistance, compatibility with other polymers, rheological properties, crystal behavior and the like. Also, it has a similar density to that of polypropylene and low density polypropylene, and has a similar melting point to that of high density polyethylene. Also, a stereospecific polybutylene has such an excellent stability that it has a long-lasting durability even at a high temperature.

Furthermore, a stereospecific polybutylene has the advantage that it can be readily used in the processes such as extrusion, injection, blow molding and the like, because it can be readily used in the conventional machines for said processes in which polyolefin has been used.

Available temperature range of such a stereospecific polybutylene is approximately −20~105° C. and a stereospecific polybutylene can be applied to various manufactured goods such as hot or cold water pipe, opening of soft package, polypropylene film, fiber-softening agent or capability-enhancing agent of hot melt adhesives and the like.

A stereospecific polybutylene can be obtained by the process that hydrocarbon is used as a solvent or the process that 1-butene in itself is used as a solvent Currently, due to the problem of separation after preparation and the like, a stereospecific polybutylene has been obtained by the latter process commercially.

Generally, a stereospecific polybutylene is obtained by polymerizing 1-butene in the presence of main catalyst based on organic aluminium compound such as diethylaluminium chloride and titanium trichloride.

According to this process, the stereospecificity of produced polybutylene is not high enough and, therefore, non-stereospecific polybutylene should be removed. Moreover, due to its low activity, this process needs the step of removing catalytic residues that deteriorate physical properties of the polymer.

A stereospecific polybutylene can be obtained by polymerizing 1-butene in the presence of the catalytic system consisting of internal electron donor and titanium supported on magnesium chloride.

However, this process does not have a high catalytic activity compared to that of a highly active conventional process for the preparation of polyethylene or polypropylene and, therefore, this process has the problem that titanium components still resides in the polymer in ppm (weight) level.

EP 187,034 A2 discloses a conventional process for the preparation of a stereospecific polybutylene.

In this process, so as to prepare a high stereospecific polybutylene in the form of particle, a lower hydrocarbon such as normal butane, isobutane, normal pentane, isopentane and cyclopentane as a solvent, a Ziegler-Natta catalyst, an organic aluminium compound, an external electron donor (Lewis base) and 1-butene are used in the process of polymerization at 20~45° C. This process is intended to solve the problem of conventional processes that the used solvent should be removed from produced polybutylene.

This process has advantages that the step of removing non-stereospecific polybutene-1 is not necessary due to the very high stereospecificity of 80 or more of produced polybutylene and the separation of produced polybutylene from the solvent is easy.

However, since the catalytic activity in this process is low (2,360 g/g-cata 4 h, that is, 590 g/g-cata h), the step of removing catalytic residues that deteriorate physical properties of the polymer is required. Also, the catalytic efficiency of this process is too low for the process to be applied effectively to commercial applications.

U.S. Pat. No. 6,306,996 B1 discloses another conventional process for the preparation of a stereospecific polybutylene.

In this process, polybutylene is obtained by 2-stage polymerization of 1-butene in the presence of main catalyst supported on magnesium chloride, wherein 1-butene in itself is used as a solvent and a monomer; and tributylaluminium (TIBA) is used, and diisopropyl dimethoxy silane (DIPMS) is used as an external electron donor.

According to this process, we can obtain the polybutylene that has satisfactory properties, for example, high stereospecificity, a content of catalytic residues expressed in terms of titanium ppm of 50 or less, a molecular weight distribution (Mw/Mn) of 6 or more. Also, this process shows the catalytic activity based on polybutylene homopolymer of 14,000 g/g-cata. 4 h, that is, 3,500 g/g-cata. h.

However, this process also has much lower catalytic activity than that of a highly active process for the preparation of polyethylene or polypropylene and, therefore, it has a long reaction time, which means the decrease of its productivity.

DISCLOSURE OF THE INVENTION

The present invention is intended to solve the problems as described above, and an object of the present invention is to provide a highly active process for the preparation of a high stereospecific polybutylene polymer, wherein the polybutylene polymer has a high stereospecificity, and titanium is not detected in the ppm (weight) level, and it is possible to polymerize 1-butene with a high activity similar to that of a highly active process for the preparation of polyethylene or polypropylene.

Another object of the present invention is to provide a high stereospecific polybutylene polymer prepared by the process of the present invention, which has a high stereospecificity and, also, in which titanium is not detected in the ppm (weight) level compared to the polybutylene prepared by the conventional processes.

To achieve above objects, the highly active process for the preparation of the high stereospecific polybutylene polymer of the present invention is characterized by comprising the step (S1) of polymerizing a reactive monomer, 1-butene, which is used or is not used as a solvent, in the presence of catalyst and inert gas.

The step (S1) is characterized by increasing pressure in a polymerization reactor using the inert gas to a higher pressure than gas-liquid equilibrium pressure of reactants at a given reaction temperature.

The step (S1) is characterized by using the inert gas which is one or more selected from the group consisting of nitrogen, helium and argon.

The step (S1) is characterized by having a reaction temperature be 10° C.~110° C.

The step (S1) is characterized by having the reaction temperature be 20° C.~90° C.

The high stereospecific polybutylene polymer prepared by the process of the present invention is characterized by being a homopolymer of 1-butene or a copolymer containing α-olefin and up to 40% by weight of a comonomer, and having such properties that 1) titanium in catalytic residues is not detected in ppm (weight) level, 2) stereospecificity (Isotactic Index, mmmm %) determined by $^{13}$C-NMR is 96 or more, 3) molecular weight distribution (Mw/Mn) is 3~6.

The process for the preparation of the high stereospecific polybutylene polymer according to the present invention is as follows:

Inert gas which has never been used in the conventional processes for the preparation of a high stereospecific polybutylene polymer is used on the polymerization of the present invention and so, contrary to the general rections which use inert gas, a high stereospecific polybutylene polymer can be obtained with a high catalytic yield similar to that of a highly active process for the preparation of polyethylene or polypropylene.

With regard to the polymerization process, the following description is mostly focused on the procedure in batch reactor, but it is clear that the procedure of the present invention is not limited to using the reactor and the procedure of the present invention can be carried out in all kinds of reactors such as CSTR, tubular reactor or other reactors as well as batch reactor.

The first step is to introduce 1-butene that is used as a solvent and/or a reaction monomer to a reactor, wherein a pretreatment is carried out with introduced cocatalyst (g) and external electron donor (h).

Here, after the reactor is purged by vacuumizing and introducing inert gas stream repeatedly, the pretreatment is carried out while 1-butene, a cocatalyst (g) and an external electron donor (h) are introduced to the reactor and then mixed.

1-Butene is polymerized while the cocatalyst (g) contacts with main catalyst (i) such as Ziegler-Natta catalyst and the like in the following second step. Also, the external electron donor (h) is introduced to maximize the stereospecificity.

In this first step, an anticatalyst, for example moisture, oxygen, carbon monoxide, carbon dioxide, acetylene, etc. in the reactor should be removed before the polymerization. The removal can be carried out by a vacuum purging, an inert gas (j) purging or a combination thereof.

Next, in the second step, polymerization is carried out by introducing main catalyst (i) and inert gas (j) to the reactor and then elevating temperature to the corresponding polymerization temperature with agitation. Here, a molecular weight control agent is added simultaneously.

The second step is the step that main catalyst such as Ziegler-Natta catalyst and the like, which is a polymerization catalyst, is introduced to the reaction system; a molecular weight control agent is added; pressure is applied by using inert gas (j); and then polymerization is carried out at the corresponding elevated polymerization temperature with agitation.

Here, the polymerization temperature is 10° C.~110° C., preferably 20° C.~90° C. The pressure of the reactor is approximately 1~1000 bar, preferably 1~60 bar.

With regard to the polymerization time, average residence time is approximately 10 min~20 hrs, preferably approximately 30 min~4 hrs for batch polymerization, and is also approximately 10 min~20 hrs, preferably approximately 30 min~4 hrs for polymerization using CSTR.

The high activity of polymerization can be obtained at the reaction temperature, the reaction pressure and the reaction time as described above.

To control the molecular weight of polymer, hydrogen can be used as a molecular weight control agent. Also, the molecular weight of polymer can be controlled by adjusting the reaction temperature.

In this second step, the activity of polymerization is increased considerably by carrying out the polymerization reaction at a higher pressure than gas-liquid equilibrium pressure at a given reaction temperature with introducing the inert gas (j), which does not take part in any reaction in the reaction system, so as to maintain the constant pressure as described above.

In this step, when suitable gas pressure is not applied, the activity of polymerization will be relatively reduced and the activity of catalyst will be relatively reduced in the preparation of polybutylene.

In this step, if necessary, a small amount of α-olefin having from 1 to 20 of carbon atom(s) such as ethylene or propylene can be introduced as a comonomer.

Next, in the third step, produced polybutylene is agitated in a polymerization reactor or a separate container, wherein stabilizers and additives (k) are introduced.

In this step, antioxidants etc. can be added to reduce the degradation of the polybutylene, which is due to the heat that will be applied to the polybuthylene in the process of transferring the polybutylene after depressurization if the polybutylene is used on industrial applications.

With regard to the post-reactor step, in case of low density polyethylene (LDPE) of bulk-solution process, which is conceptually similar to the polybutylene, it is general that stabilizers and additives are introduced to extractor, which is the final step, by adding masterbatch (MB) at the same time. However, when stabilizers and additives (k) are introduced in the third step of the present invention as described above, the stabilizers and the additives (k) can be mixed more homogeneously with polybutylene. Also, if the stabilizers and the additives (k) can be dissolved in hydrocarbons, or if they have the particle size in the range of nanometer even though they can not be dissolved in hydrocarbons, they can be mixed in molecular level.

In the third step, when the polymerization reactor is a batch reactor, the stabilizers and the additives (k) can be introduced directly without a separate reactor, and when the polymerization reactor is a continuous stirred tank reactor (CSTR), homogeneous mixing can be carried out by introducing the stabilizers and the additives (k) into the apparatus that is equipped with a separate stirrer or a miscible device.

Next, in the fourth step, after pressure is reduced, unreacted monomers are removed and the polybutylene is made in the form of solid.

In this step, pressure is reduced sufficiently and the polybutylene in the form of solid is obtained.

Hereinafter, the respective components that are used in the process for the preparation of the polybutylene according to the present invention are described in detail.

As the main catalyst (i), a titanium trichloride catalyst, a solvay type titanium trichloride catalyst, a titanium tetrachloride catalyst, or a titanium catalyst supported on silica can be used. Also, a Ziegler-Natta catalyst and a single-site catalyst such as a metallocene can be used, or a transition metel catalyst can be used.

To obtain a high catalytic activity, it is desirable that a metallocene catalyst, a titanium catalyst supported on silica, or a titanium catalyst supported on magnesium including a polymerization catalyst supported on magnesium are used.

The metallocene catalyst includes pentamethylcyclopentadienyizirconium trichloride, bis(pentamethylcyclopentadienyl)zirconium dichloride, indenyliirconium trichloride, bis(indenyl)zirconium dichloride, dimethylsillylene-bis(indenyl)zirconium dichloride, (dimethylsillylene)(dimethylsillylene)-bis(indenyl)zirconium dichloride, (dimethylsillylene)-bis(2-methyl-4-phenylindenyl)zirconium dichloride, (dimethylsillylene)-bisfbenzoindenyl)zirconium dichloride, ethylene-bis(indenyl)zirconium dichloride, (ethylene)(ethylene)-bis(indenyl)zirconium dichloride, (ethylene)(ethylene)-bis(3-methylindenyl)zirconium dichloride, (ethylene)(ethylene)-bis(4,7-dimethylindenyl)zirconium dichloride, (tert-butylimide)(tetramethyl-η5-cyclopentadienyl)-1,2-ethandiylzirconium dichloride, (tert-butylimide)dimethyl(tetramethyl-η5-cyclopentadienyl) silanezirconium dichloride, (methylamide)(tetramethyl-η5-cyclopentadienyl)-1,2-ethandiylzirconium dichloride and the like.

It is preferable to use the following magnesium-supported polymerization catalyst as a Ziegler-Natta catalyst, since it's use is eco-friendly contrary to the use of conventional phtalate type catalysts as an internal electron donor.

That is, to the pretreatment reactants in the reaction that a halogen-containing magnesium compound reacts with an organic compound containing an activating hydrogen is added phthalic anhydride (PA) to form a homogeneous solution; a titanium chloride is added to the homogeneous solution to recover a sphere-shaped granular carrier, to the recovered carrier is added the internal electron donor that has a silicon atom in dialkylpropane 1,3-diether based structure of the Formula 1 instead of a transitional metal compound and phthalate based internal electron donors, which are endocrine disruptors, to form the magnesium-supported polymerization catalyst. This catalyst can be used as a catalyst in the polymerization of α-olefin having 3 or more of carbon atoms, and has eco-friendly properties and a high activity.

[Structural Formula 1]

Wherein, R1 and R2 are aliphatic or aromatic hydrocarbon having from 1 to 20 of carbon atom(s), R6 is aliphatic or aromatic hydrocarbon having from 1 to 30 of carbon atom(s), R3, R4 and R5 are hydrogen or aliphatic or aromatic hydrocarbon having from 1 to 30 of carbon atom(s).

The internal electron donor has eco-friendly properties, contrary to the phthalate based internal electron donors that are endocrine disruptors and that have been used frequently in the conventional catalytic system. Also, the compound used as the internal electron donor can be used as an external electron donors.

The chemical structure of the magnesium-supported polymerization catalyst has not been established yet but it comprises 1~4% by weight of titanium, 15~30% by weight of magnesium, 60~80% by weight of halogen and less than 1.0% by weight of silicone (Si).

Also, the main catalyst (i) can be used after prepolymerization with α-olefin such as ethylene or propylene.

As the co-catalyst (g), organometallic compounds of $R_NMX_{3-N}$ (wherein, M is magnesium, boron, aluminium, zinc and the like, and represents the metals of group IA, IIA, IIB, IIIB or IVB of the periodic table, R is straight, branched or cycloalkyl group having from 1 to 20 of carbon atom(s), X is halogen atom, n is an integer in the range of $0<n\leq3$) are used.

Particular examples of the organometallic compounds can be selected from the group consisting of organic aluminium compound, that is diethylaluminium chloride (DEAC), ethylaluminium dichloride (ADC), dinormalbutylaluminium chloride (DNBAC), diisobutylaluminium chloride (DI-BAC), ethylaluminium sesquichloride (EASC), triethylaluminium (TEA), triisobutylaluminium (TIBA), trinormalhexylaluminium (TNHA), trinormaloctylaluminium (TNOA), trinormaldecylaluminium (TNDA), triethylzinc, triethylboran, triisobutylboran, methylaluminoxanes (MAO) and the like, or can be the mixture of two or more of the foregoing compounds.

Preferably, diethylaluminium chloride (DEAC), triethylaluminium (TEA), triisobutylaluminium (TIBA) and methylaluminoxanes (MAO) can be used.

Further, the cocatalyst that is an external electron donor (h) can be introduced to maximize the stereospecificity of the polybutylene.

For example, silane compounds, inorganic acids, hydrogen sulfides, ethers, diethers, esters, amines, organic acids, organic acid esters or the mixture of two or more of the foregoing compounds can be used.

As the external electron donor (h), it is preferable to use alkyl-, aryl- or alkoxy-containing silane compound. As the particular examples, diphenyldimethoxysilane, phenyltrimethoxysilane, isobutylmethoxysilane, diisobutyldimethoxysilane, cyclohexylmethyldimethoxysilane, and diisopropyldimethoxysilane can be used.

Also, as described above, the structurally particular internal electron donor that has a silicon atom in dialkylpropane 1,3-diether based structure can be used as external electron donors (h).

In the present invention, it is important that the process is carried out with increasing the pressure in the polymerization reactor using inert gas (j), which does not take part in the reaction, to a higher pressure than gas-liquid equilibrium pressure of reactants at a given reaction temperature, in order to increase the polymerization activity of the stereospecific polybutylene.

That is, it is possible to produce the polybutylene at a higher yield by polymerization at a higher pressure than gas-liquid equilibrium pressure of reactants at a given reaction temperature by introducing inert gas that does not take part in the reaction into batch reactor, CSTR or another type of reactors in the presence of Ziegler-Natta catalyst etc. and organic aluminium compound.

The inert gas is the gas that dose not take part in the reaction wherein polybutylene is produced by polymerizing 1-butene, and includes nitrogen, helium, neon, argon, crypton, xenon, radon or the mixture of two or more of the foregoing compounds. Preferably, the inert gas is any one or more selected from the group consisting of nitrogen, helium and argon.

As the stabilizers and the additives (k), phenol based antioxidants, phosphorous or sulfur based antioxidants, thermal stabilizers, nucleating agents and the like that are used in the polymerization of polyolefin can be used, if necessary. Also, other stabilizers and additives (k) can be further added.

The high stereospecific polybutylene polymer prepared by the present invention is a homopolymer of 1-butene or a copolymer containing α-olefin and up to 40% by weight of a comonomer, and has the following properties.

First, as shown in the following examples, titanium in catalytic residues is not detected in ppm (weight) level.

Also, as shown in the following examples and appended figures, the stereospecificity (Isotactic Index, mmmm %) determined by $^{13}$C-NMR is 96 or more.

The molecular weight distribution (Mw/Mn) of the polybutylene polymer is 3~6. The molecular weight distribution can be controlled and expanded to a molecular weight distribution (Mw/Mn) of 8 or more by the handling of the procedure as follows:

That is, when the polybutylene is prepared in CSTR, the molecular weight distribution (Mw/Mn) can be controlled in the range of 3~6 by using only single reactor and one-stage polymerization. Meanwhile, when the polybutylene is prepared in batch reactor, CSTR, other reactor, the molecular weight distribution (Mw/Mn) can be controlled to 8 or more by using two or more same-type or different-type reactors that are connected in series or in parallel for polymerization.

BEST MODE FOR CARRYING OUT THE INVENTION

The present invention will be illustrated in more detail by the following examples without limiting it.

EXAMPLE 1

Sample B (a) Preparation of Catalyst

To a 1 L 4-neck round bottom flask equipped with a magnetic stirrer, a condenser and a temperature detector was added 50 ml of decane and 3.0 g of magnesium chloride under nitrogen gas stream, agitated for several minutes, added 1 ml of 2-ethylhexanol, increased temperature to 130° C. over 20 min with agitation, and then reacted for 1 hr.

After reaction for 1 hr, 1.0 g of PA was added. The resulting mixture was reacted for 1 hr at 130° C. with agitation under nitrogen atmosphere. The resulting homogeneous solution was cooled to ambient temperature. Titanium tetrachloride was dropped at a low temperature over 1 hr, and agitated to obtain slurry which contains solid product.

The solid product was filtered, separated and washed with heptane four times. To the resulting solid product was added 50 ml of toluene, added titanium chloride with agitation, increased temperature to 100° C., dropped 0.30 g of 2-isopropyl-2-trinethylsillylmethyl-1,3-dimethoxy propane, increased temperature to 110° C., and then reacted for 2 hrs.

On completion of the reaction, the solid product was filtered, separated and washed with heptane four times. To the washed solid product was added heptane and titanium chloride, and reacted at 98° C. for 2 hrs. The resulting solid catalyst component was filtered, separated and washed with heptane thoroughly until free titanium compound has not been detected any more to obtain solid catalyst suspended in heptane.

The constituents of the obtained catalyst were analyzed with ICP. The results showed that there are 2~3% by weight of titanium and 16~19% by weight of magnesium.

(b) Polymerization for Stereospecific Polybutylene Polymer

A 2 L stainless steel autoclave to be used was vacuum-purged and nitrogen-purged repeatedly. To the autoclave was added 0.01 g of the solid catalyst component in (a) above, 0.01 g of diisobutylmethoxysilane, 0.3 g of triethylaluminiumchloride (TEA), 1.2 L of 1-butene and 200 ml of hydrogen under nitrogen gas stream, applied 3 bar of pressure with nitrogen additionally, increased the temperature of the autoclave up to 80° C. and then carried out polymerization.

After one and half hrs, the autoclave was depressurized. The unreacted 1-butene monomers were removed. The obtained polymer was dried at 90° C. for 12 hrs under the vacuum state.

The activity of the dried polybutylene polymer was 23,000 g-/g-cata.1.5 h that was 15,300 g-/g-cata h; the molecular weight (Mw) was 430,000; the molecular weight distribution (Mw/Mn) was 3.22; the density was 0.886; and the melting point was 116.9° C.; titanium was not detected in ppm (weight) level.

The stereospecificity was assessed with NMR. The stereostructure of the polybutylene can be judged from the shape of resonance peak in the range of 26~28 ppm.

EXAMPLE 2

Polybutylene polymer was prepared by the same procedure as that of example 1 except that 6 bar of pressure was applied to the autoclave with nitrogen additionally on polymerization.

The activity of the obtained polybutylene polymer was 32,400 g-/g-cata 1.5 h that was 21,600 g-/g-cata h; the molecular weight distribution (Mw/Mn) was 3.69; the density was 0.884; the stereospecificity (Isotactic Index, mmmm %) was 99.7; and the melting point was 117.0° C.; titanium was not detected in ppm (weight) level.

EXAMPLE 3

Polybutylene polymer was prepared by the same procedure as that of example 2 except that 0.01 g of 2-isopropyl-2-trimethylsillylmethyl-1,3-dimethoxy propane, which was used as the internal electron donor in the above description, was used as an external electron donor instead of diisobutylmethoxysilane on polymerization The activity of the obtained polybutylene polymer was 29,700 g-/g-cata 1.5 h that was 19,800 g-/g-cata h; the molecular weight distribution (Mw/Mn) was 4.11; the density was 0.880; the stereospecificity (Isotactic Index, mmmm %) was 96.9; and the melting point was 115.6° C.; titanium was not detected in ppm (weight) level.

EXAMPLE 4

Polybutylene polymer was prepared by the same procedure as that of example 2 except that propylene was added as comonomer on polymerization.

The activity of the obtained polybutylene polymer was 30,700 g-/g-cata 1.5 h that was 20,500 g-/g-cata h; the molecular weight distribution (Mw/Mn) was 3.45; the density was 0.881; the methyl group on the main chain is 14% (by weight); and the melting point is 116.5° C., 134.2° C.; titanium was not detected in ppm (weight) level.

EXAMPLE 5

A 50 L stainless steel autoclave to be used was vacuum-purged and nitrogen-purged repeatedly. To the autoclave was added 0.3 g of the solid catalyst component produced by the same procedure as that of example 1, 0.3 g of diisobutylmethoxysilane, 0.12 g of triethylaluminiumchloride (TEA), 25 L of 1-butene and 10 bar of hydrogen under nitrogen gas stream, applied 4 bar of pressure with nitrogen additionally, increased the temperature of the autoclave up to 80° C. and then carried out polymerization.

After one and half hrs, the polymer in the autoclave was transferred to a subsequent stirred tank added BHT as an antioxidant, and depressurized to remove unreacted 1-butene monomers. The obtained polymer was dried at 90° C. for 12 hrs under the vacuum state.

The activity of the dried polybutylene polymer was 28,300 g-/g-cata 1.5 h that was 18,900 g-/g-cata h; the molecular weight distribution (Mw/Mn) was 4.05; and MFR was 0.382; titanium was not detected in ppm (weight) level.

EXAMPLE 6

Used a facility comprising 2 parallel connected polymerization reactors (50 L, autoclaves), a subsequent stirred tank (100 L) and an apparatus for pressure-reducing and recovery, the two 50 L stainless steel autoclaves to be used were vacuum-purged and nitrogen-purged repeatedly. To the autoclaves were added 0.3 g of the solid catalyst component produced by the same procedure as that of example 1, 0.3 g of diisobutylmethoxysilane, 0.12 g of triethylaluminiumchloride (TEA), 25 L of 1-butene and 10 bar of hydrogen under nitrogen gas stream respectively, applied 4 bar of pressure with nitrogen additionally, increased the temperature of the one autoclave up to 70° C. and the temperature of the other autoclave up to 80° C., and then carried out polymerization.

After one and half hrs, the polymer in the respective autoclave was transferred to the subsequent stirred tank simultaneously, mixed, added BHT as an antioxidant, and depressurized to remove unreacted 1-butene monomers. The obtained polymer was dried at 90° C. for 12 hrs under the vacuum state.

The activity of the dried polybutylene polymer was 27,800 g-/g-cata 1.5 h that was 18,500 g-/g-cata R; the molecular weight distribution (Mw/Mn) was 7.4; and MFR was 0.45; titanium was not detected in ppm (weight) level.

EXAMPLE 7

A 50 L stainless steel autoclave equipped with automatic on-off control valve to be used was vacuum-purged and nitrogen-purged repeatedly. To the autoclave was added 0.3 g of the solid catalyst component produced by the same procedure as that of example 1, 0.3 g of diisobutylmethoxysilane, 0.12 g of triethylaluminiumchloride (TEA), 25 L of 1-butene and 10 bar of hydrogen under nitrogen atmosphere, applied 4 bar of pressure with nitrogen additionally, increased the temperature of the autoclave up to 80° C. and then carried out polymerization. After one and half hr, the polymerization was carried out using CSTR.

The residence time was set as one and half hr. The natural loss of pressure caused by the diffluence of nitrogen dissolved in liquid out of the reactor was compensated by supplementing nitrogen. The amount of the charge of the solid catalyst component produced by the same procedure as that of example 1 and triethylaluminiumchloride was controlled according to the difference of reaction temperature with maintaining the temperature in the reactor constantly.

After one and half hrs from the initiation of the polymerization, an amount of the polymer in the autoclave was transferred to a subsequent stirred tank. When the predetermined amount of polymer was transferred, added BHT as an antioxidant, and depressurized to remove unreacted 1-butene monomers. The obtained polymer was dried at 90° C. for 12 hrs under the vacuum state.

The average activity of the dried polybutylene polymer was 19,200 g-/g-cata h; the molecular weight distribution (Mw/Mn) was 4.88; and M was 0.37; titanium was not detected in ppm (weight) level.

EXAMPLE 8

Used a facility comprising two 50 L stainless steel autoclaves equipped with automatic on-off control valve respectively, a subsequent stirred tank (100 L) and an apparatus for pressure-reducing and recovery, the two 50 L stainless autoclaves to be used were vacuum-purged and nitrogen-purged repeatedly. To the autoclaves was added 0.3 g of the solid catalyst component produced by the same procedure as that of example 1, 0.3 g of diisobutylmethoxysilane, 0.12 g of triethylaluminiumchloride (TEA), 25 L of 1-butene and 10 bar of hydrogen under nitrogen atmosphere respectively, applied 4 bar of pressure with nitrogen additionally, increased the temperature of the one autoclave up to 70° C. and the temperature of the other autoclave up to 80° C., and then carried out polymerization. After one and half hr, the polymerization was carried out using CSTR.

The residence time was set as one and half hr. The natural loss of pressure caused by the diffluence of nitrogen dissolved in liquid out of the reactor was compensated by supplementing nitrogen. The amount of the charge of main catalyst and triethylaluminiumchloride was controlled according to the difference of reaction temperature with maintaining the temperature in the reactor constant.

After one and half hrs from the initiation of the polymerization, an amount of the polymer in the respective autoclaves was transferred to the subsequent stirred tank and mixed. When the predetermined amount of polymer was transferred, added BHT as an antioxidant, and depressurized to remove unreacted 1-butene monomers. The obtained polymer was dried at 90° C. for 12 hrs under the vacuum state.

The average activity of the dried polybutylene polymer was 17,900 g-/g-cata h; the molecular weight distribution (Mw/Mn) was 4.88; and MFR was 0.45; titanium was not detected in ppm (weight) level.

EXAMPLE 9

Polybutylene polymer was prepared by the same procedure as that of example 1 except that an additional pressure was not applied to the autoclave with nitrogen.

The activity of the obtained polybutylene polymer was 14,700 g-/g-cata 1.5 h that was 9,800 g-/g-cata h; the molecular weight distribution (Mw/Mn) was 3.93; the density was 0.884; the stereospecificity (Isotactic Index, mmmm %) was 96.7; and the melting point was 117.4° C.; titanium was not detected in ppm (weight) level, but the polymer has a light color of bright redyellow.

EXAMPLE 10

Polybutylene polymer was prepared by the same procedure as that of example 2 except that cocatalyst (h) diisobutylmethoxysilane, an external electron donor, was not introduced to the autoclave on polymerization.

The activity of the obtained polybutylene polymer was 35,200 g-/g-cata 1.5 h that was 23,500 g-/g-cata h; the molecular weight distribution (Mw/Mn) was 4.11; the stereospecificity (Isotactic Index, mmmm %) was 61.0; and the melting point was 108.5° C.; titanium was not detected in ppm (weight) level.

EXAMPLE 11

A catalyst was prepared by the same procedure as that of example 1 except that 0.43 g of dinormalbutylphthalate (DNBP) instead of 2-isopropyl-2-trinethylsillylmethyl-1,3-dimethoxy propane was introduced as an internal electron donor. Polybutylene was prepared by the same procedure as that of example 2.

The activity of the obtained polybutylene-propylene copolymer was 27,600 g-/g-cata 1.5 h that was 18,400 g-/g-cata h; the molecular weight distribution (Mw/Mn) was 3.55; the density was 0.886; the stereospecificity (Isotactic Index, mmmm %) was 98.2; and the melting point was 116.7° C.; titanium was not detected in ppm (weight) level.

Figure 1A:
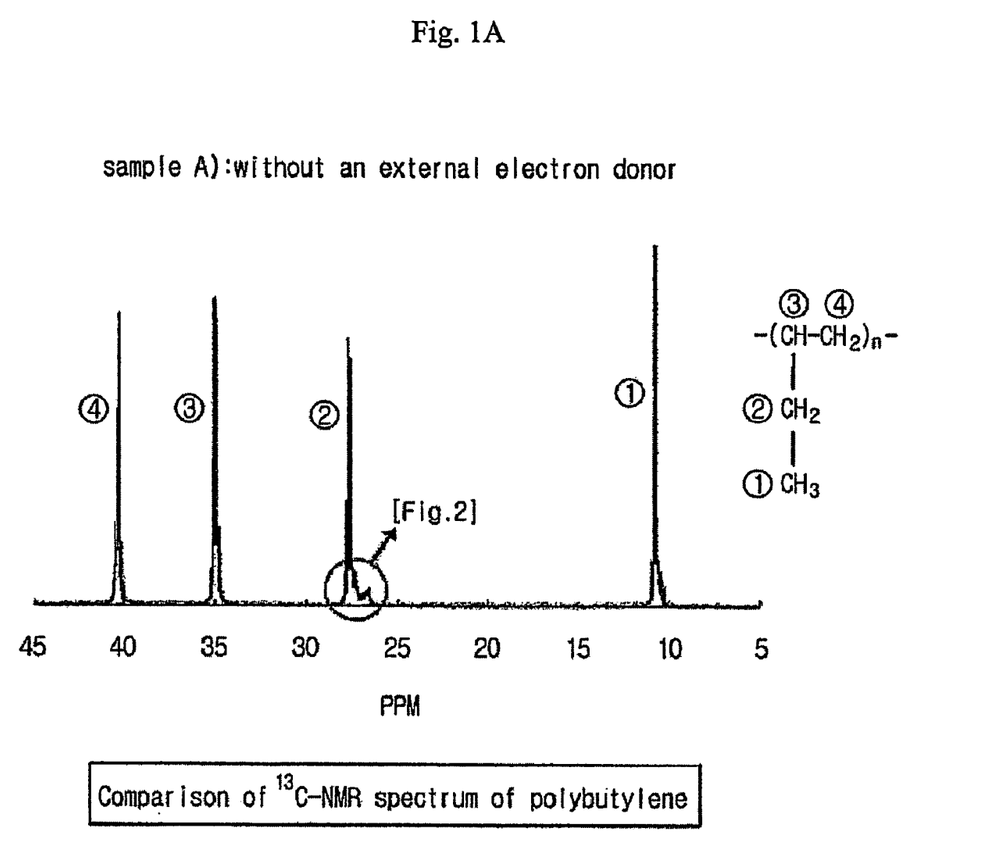
FIG. 1A is $^{13}$C-NMR spectrum of polybutylene homopolymer that is polymerized without an external electron donor (Lewis base)(See example 10).
Figure 1B:
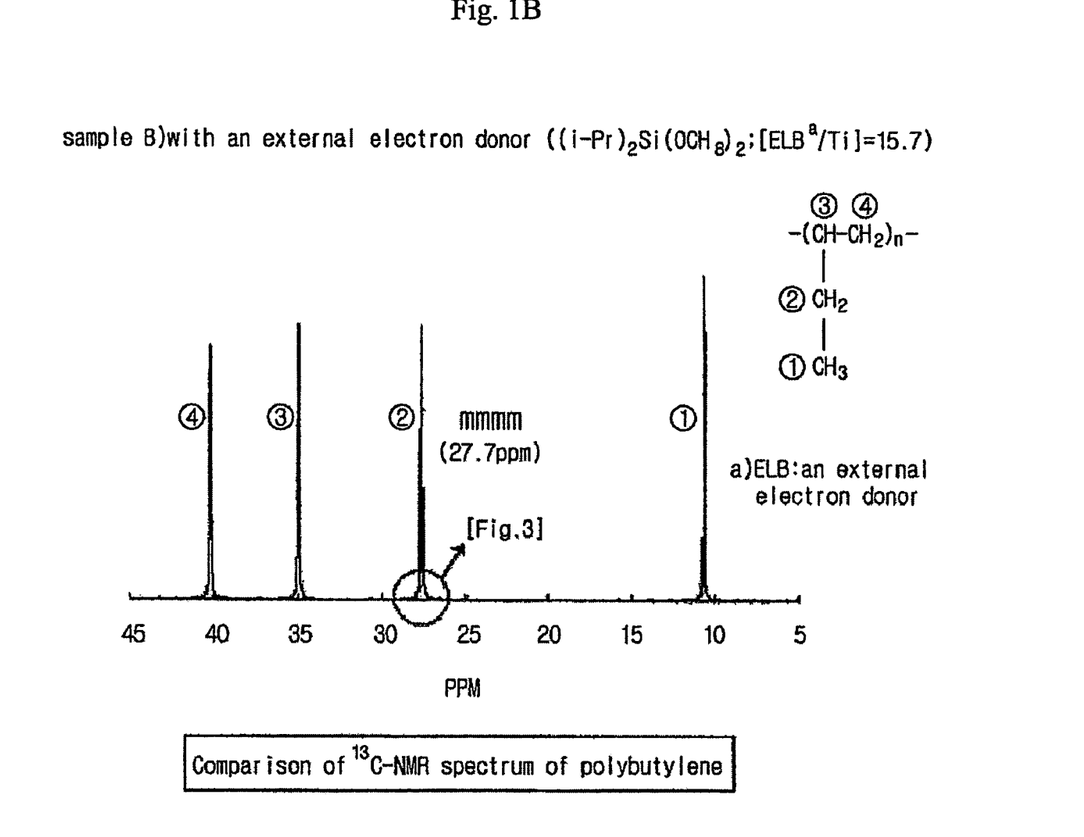
FIG. 1B is $^{13}$C-NMR spectrum of polybutylene homopolymer that is polymerized with an addition of dimethoxy diisopropyl silane ((i-Pr)$_2$Si(OCH$_3$)$_2$) as an external electron donor (Lewis base)(See example 1).

FIG. 1A is $^{13}$C-NMR spectrum of polybutylene homopolymer that is polymerized without an external electron donor (Lewis base) according to the present invention (See example 10). FIG. 1B is $^{13}$C-NMR spectrum of polybutylene homopolymer that is polymerized with an addition of dimethoxy diisopropyl silane ((i-Pr)$_2$Si(OCH$_3$)$_2$) as an external electron donor (Lewis base)(See example 1).

The stereostructure of polybutylene can be determined from resonance peak of methylene carbon that is in ethyl branch of 1-butene unit (indicated as '②' in FIG. 1). As the stereospecificity (Isotacticity) is higher, the resonance peak similar to singlet peak comes to appear in the range of 26~28 ppm.

As shown in FIG. 1A, very, complicate resonance peak (multiplet peak) appeared in the range of 26~28 ppm because of the reduction of stereospecificity of polybutylene. Also, as shown in FIG. 1B, approximately perfect single resonance peak appeared in the range of 26~28 ppm because of the enhancement of stereospecificity caused by an external electron donor (Lewis base).

Figure 2:
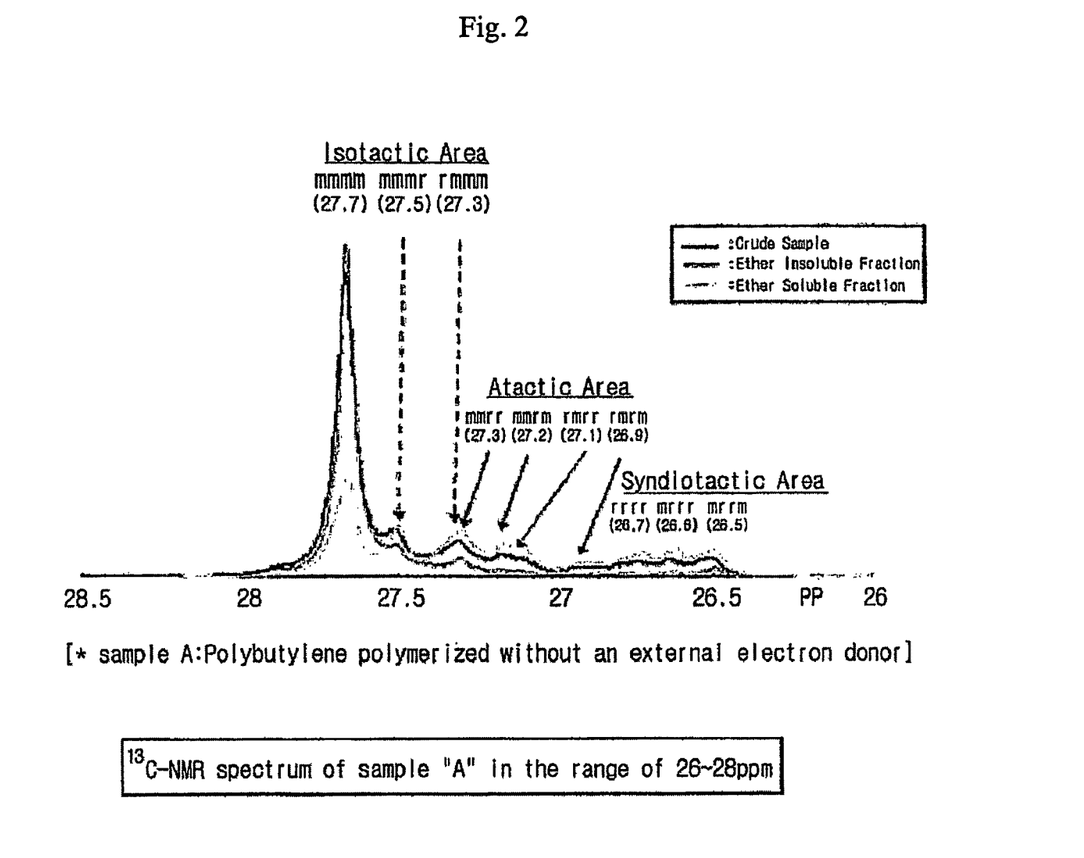
FIG. 2 is $^{13}$C-NMR spectrum in the range of 26~28 ppm of polybutylene homopolymer that is polymerized without an external electron donor (Lewis base)(See example 10).

FIG. 2 is $^{13}$C-NMR spectrum in the range of 26~28 ppm of polybutylene homopolymer that is polymerized without external electron donor (Lewis base) according to the present invention (See example 10). This is the spectrum of high stereospecific samples that are dissolved in ether, and is the spectrum of low stereospecific samples that are not dissolved in ether by using ether extraction fractionation to separate obtained polymer into stereospecific samples and non-stereospecific samples. Although large amount of samples were used, low stereospecific samples that are not dissolved in ether were obtained little.

As shown in FIG. 2, using the extraction fractionation, even a stereospecific polymer that is not dissolved in ether contains non-stereospecific units in the main chain.

Figure 3:
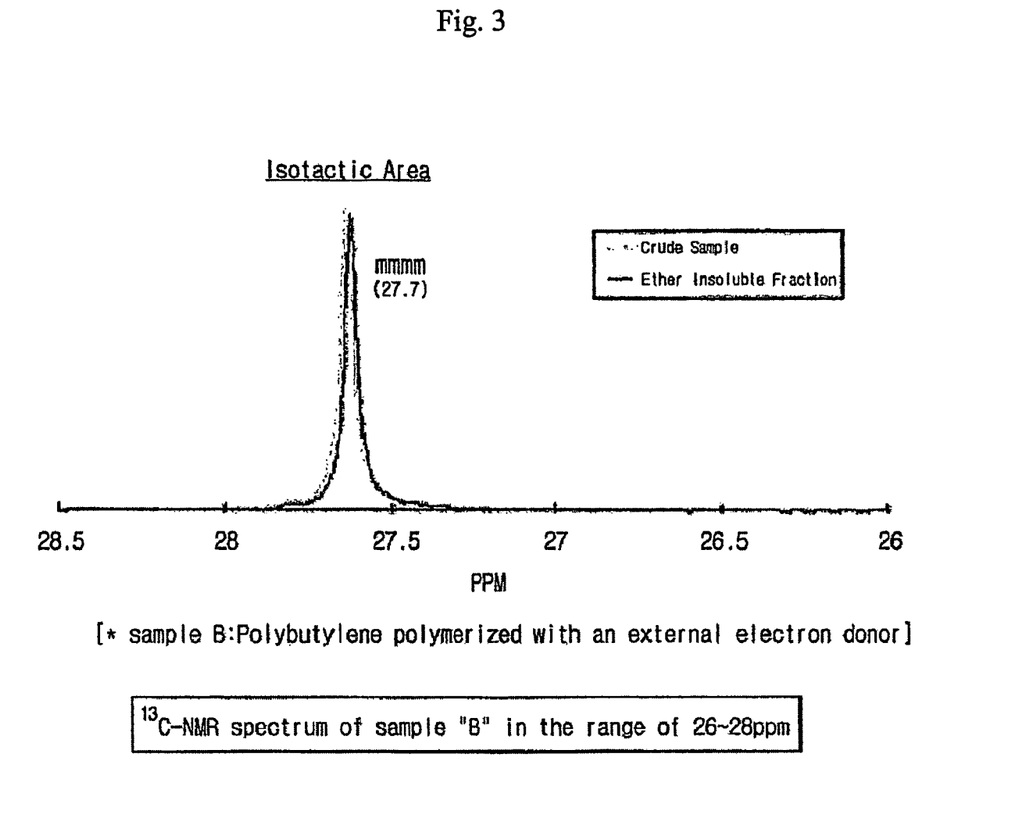
FIG. 3 is $^{13}$C-NMR spectrum in the range of 26~28 ppm of polybutylene homopolymer that is polymerized with an addition of an external electron donor (Lewis base) to increase stereospecificity (See example 1).

FIG. 3 is $^{13}$C-NMR spectrum of polybutylene homopolymer that is polymerized with an addition of an external electron donor (Lewis base) to increase stereospecificity (See example 1).

Although large amount of samples were used, low stereospecific samples that are dissolved in ether were obtained too little to determine $^{13}$C-NMR spectrum. As shown in FIG. 3, the obtained polymer shows only single resonance peak in the enlarged spectrum in the range of 26~28 ppm and the stereospecificity (Isotactic Index, mmmm %) is high to 0.987.

INDUSTRIAL APPLICABILITY

As described above, the process for the preparation of the polybutylene of the present invention has much higher activity than that of any other known processes for the preparation of polybutylene and, therefore, exhibits a high activity similar to that of a highly active process for the preparation of polyethylene or polypropylene. Thus, the productivity of the polybutylene according to the present invention is improved greatly.

Also, the effect that the process of the present invention has can be achieved by using known CSTR, tubular reactor (PFR) and other reactors as well as batch reactor.

Further, the polybutylene prepared by the process of the present invention has such a high purity of the catalyst residues that titanium is not detected in ppm (weight) level contrary to the conventional stereospecific polybutylene.

What is claimed is:

1. A process for the preparation of a high stereospecific polybutylene polymer, comprising the step (S1) of polymerizing a reactive monomer, 1-butene, which is used or is not used as a solvent, in the presence of catalyst, and in the presence of an inert gas by intentionally introducing the inert gas to a reactor with hydrogen in order that the inert gas is present in the reactor during the polymerization even after reactor purging, wherein the step S1 is carried out with increasing pressure in a polymerization reactor using the inert gas to a higher pressure than gas-liquid equilibrium pressure of reactants at a given reaction temperature.

2. The process according to claim 1, wherein the step S1 is carried out with using the inert gas which is one or more selected from the group consisting of nitrogen, helium and argon.

3. The process according to claim 2, wherein the reaction temperature in the step S1 is 10° C. to 110° C.

* * * * *